United States Patent [19]

Moore

[11] 4,279,749
[45] Jul. 21, 1981

[54] COLLAR FOR CAKE DISCHARGE CHUTE OF ROTATABLE DISC FILTER

[75] Inventor: Richard D. Moore, New Boston, N.H.

[73] Assignee: Plastic Techniques, Inc., New Boston, N.H.

[21] Appl. No.: 100,737

[22] Filed: Dec. 6, 1979

[51] Int. Cl.³ ............................................. B01D 33/36
[52] U.S. Cl. .................................... 210/330; 210/332; 193/2 R; 414/216; 414/299
[58] Field of Search ...................... 217/3 R, 3 C, 3 BC, 217/3 CB; 100/167; 193/2 C, 2 R, 4, 6; 414/150, 152, 216, 299, 328; 141/316, 390, 391; 210/330, 332, 334, 397, 402, 225; 55/435, 436; 209/149

[56] References Cited

U.S. PATENT DOCUMENTS

| 1,635,844 | 7/1927 | Hoffmann | 141/316 |
| 2,430,155 | 11/1947 | Buttery | 141/390 |
| 4,086,168 | 4/1978 | Moore | 210/330 |

Primary Examiner—Charles N. Hart
Assistant Examiner—David R. Sadowski
Attorney, Agent, or Firm—Carella, Bain, Gilfillan & Rhodes

[57] ABSTRACT

A collar for fitting over the upper end of the cake discharge chute of a rotatable disc filter, or the like. The collar has a plurality of downwardly and inwardly sloping walls which substantially reduce any tendency for cake to stick to the sides of the chute. For use with heavy cake, reinforcing members may be provided for the collar. The collar is configured for use with discharge chutes of diverse design.

9 Claims, 8 Drawing Figures

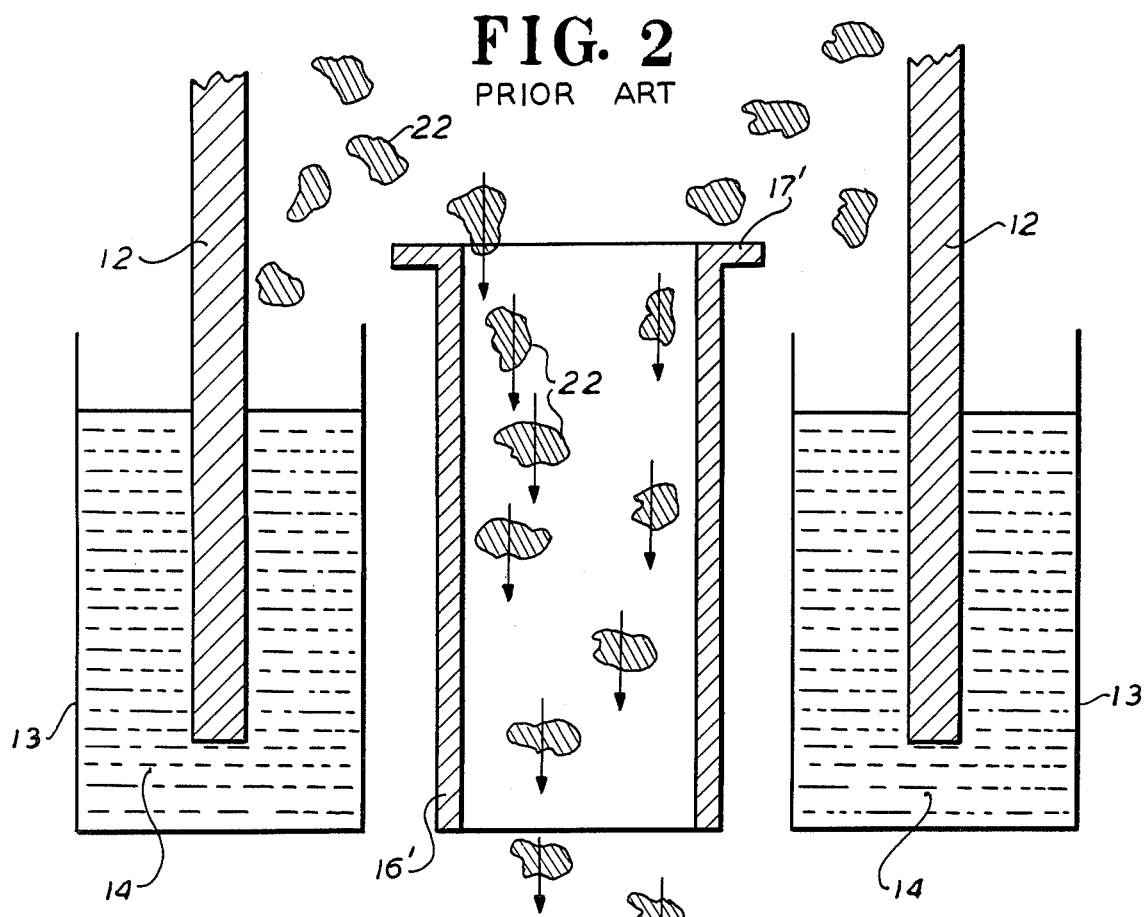
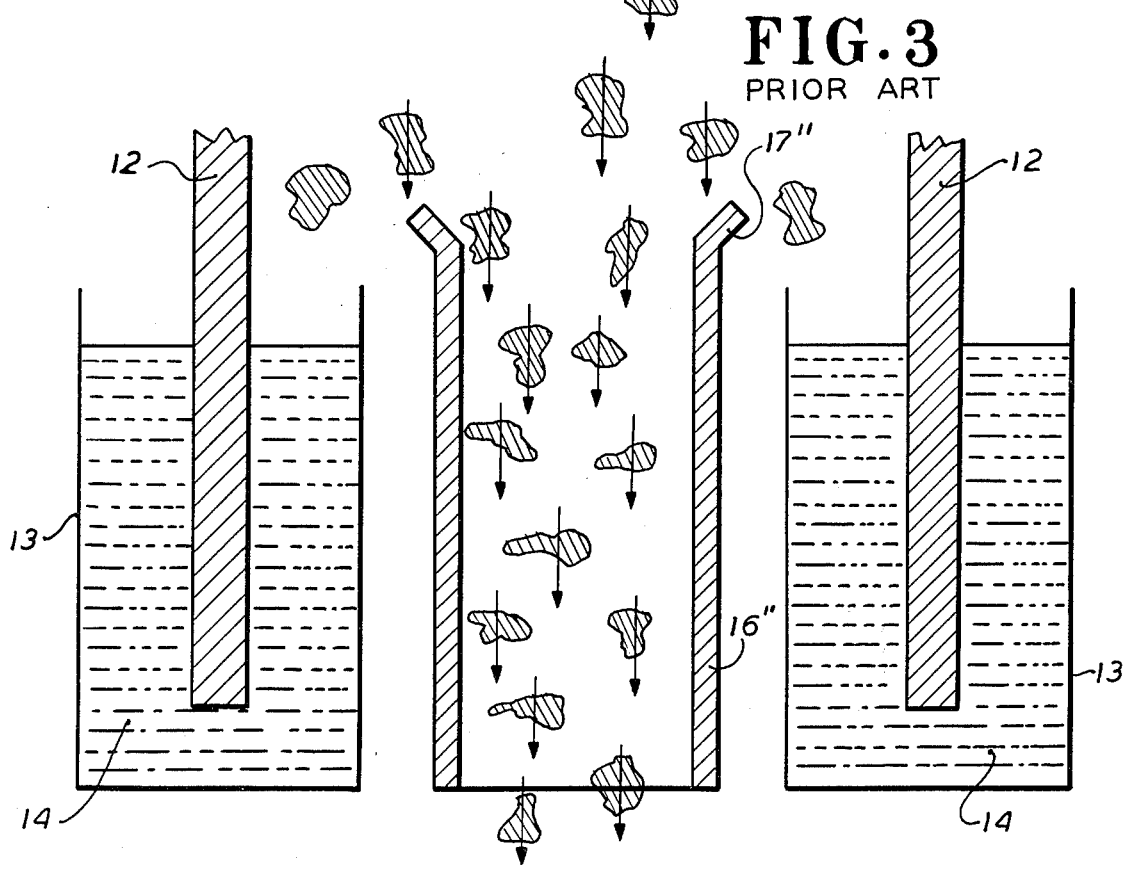

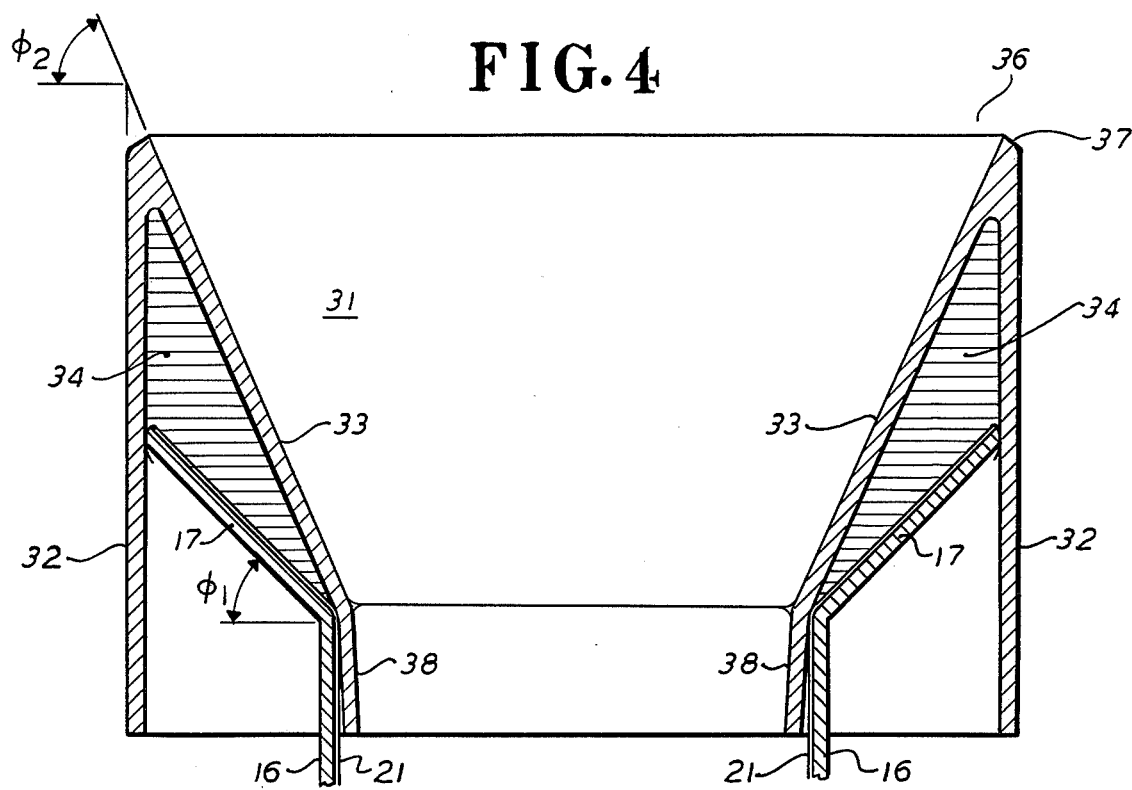
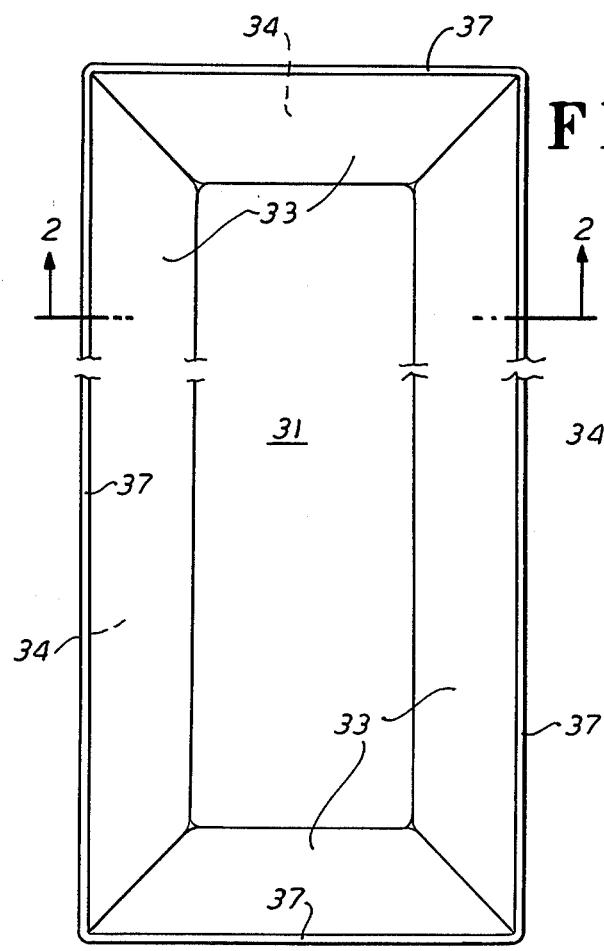
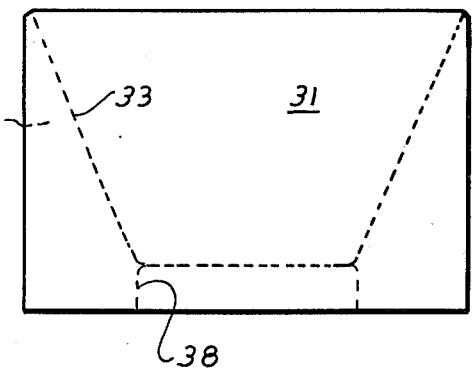

COLLAR FOR CAKE DISCHARGE CHUTE OF ROTATABLE DISC FILTER

BACKGROUND OF THE INVENTION

1. Field of the Invention

Broadly speaking, this invention relates to filtration. More particularly, in a preferred embodiment, the invention relates to methods and apparatus for improving the efficiency of rotary disc filters, and the like.

2. Discussion of the Prior Art

Rotary disc filters are widely used in industry to separate solids or semi-solids from liquids, such as water. For example, disc filters are used to separate wood pulp from water or to separate minerals, such as taconite, copper, coal, and cement, from other carrier liquids.

As discussed in U.S. Pat. No. 4,086,168 issued Apr. 25, 1978 and assigned to the same assignee as the present invention, which patent is hereby incorporated by reference as if more fully set forth herein, prior art disc filters suffer from the problem of clogging of the discharge chutes. This clogging is due to the fact that the filtered solid material, called "cake" in the industry, is typically very tacky and tends to adhere to itself and to the walls of the discharge chute. The solution to the above problem which is disclosed in the above-referenced U.S. Pat. No. 4,086,168, i.e., a replaceable, plastic, chute liner with very smooth sides, has been highly successful in practice. Nevertheless, because this liner is constrained by the preexisting geometry of the discharge chute, under certain circumstances clogging of the discharge chute can still occur. This same geometry also permits the cake to work its way between the liner and the walls of the discharge chute, which also causes clogging.

SUMMARY OF THE INVENTION

The problem then is to provide apparatus for retrofitting existing discharge chutes so that clogging can no longer occur. The apparatus should be sufficiently versatile so that it can be used alone or in conjunction with the plastic chute liner disclosed in U.S. Pat. No. 4,086,168 and with a variety of discharge chutes.

As a solution to this and other problems, a preferred embodiment of the invention comprises a collar for the cake discharge chute of a rotatable disc filter, the chute having a plurality of walls, the open upper ends of which define a cake inlet and the open lower ends of which define a cake outlet, the walls having internal surfaces interconnecting the cake inlet and outlet and defining a passage through the cake discharge chute through which the cake passes.

More specifically, the collar comprises a unitary member for pressing engagement about and with the open upper ends of the walls of the discharge chute, the member having: a plurality of outer walls parallel to the corresponding walls of the discharge chute; and a plurality of inwardly and downwardly sloping inner walls each joined at its upper end to the upper end of a corresponding outer wall, the inner and outer walls defining a cake-receiving aperture substantially corresponding to and aligning with the cake inlet defined by the open upper ends of the walls of the chute, any cake material impinging upon said inner walls being forced downwardly under the influence of gravity along a path defined by the inward and downward geometry of said walls.

The invention and its mode of operation will be more fully understood from the following detailed description when taken with the appended drawings in which:

DESCRIPTION OF THE DRAWINGS

FIGS. 2 and 3 are cross-sectional views of alternative prior art cake chutes for use with the disc filter shown in FIG. 1;

FIG. 4 is a cross-sectional view of an illustrative collar according to the present invention for use with the disc filter shown in FIG. 1;

FIGS. 5 and 6 are respectively plan and side views of the collar shown in FIG. 2.

DETAILED DESCRIPTION OF THE INVENTION

Figure 1:
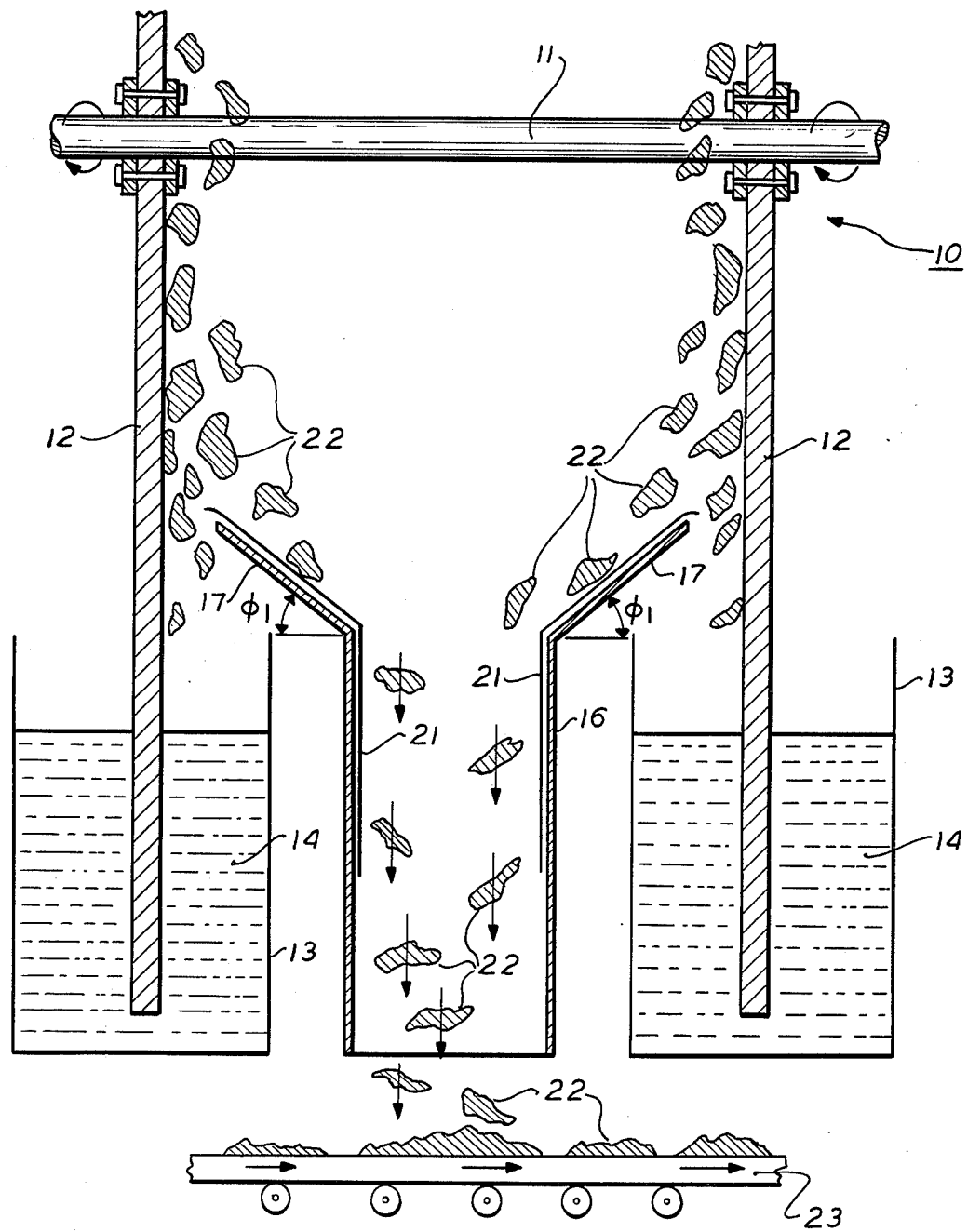
FIG. 1 is a cross-sectional view of an illustrative prior art disc filter useful in understanding the principles of the present invention.

FIG. 1 depicts the operating environment for the invention as well as illustrating the deficiencies of the prior art. As shown, disc filter 10 comprises a rotatable shaft 11 having a plurality of filter discs 12 affixed thereto. The lower extremity of each filter disc is immersed in a tank 13 which contains the liquid-solid mixture 14 to be filtered. A hollow, rectangular discharge chute 16 is positioned between each pair of filter discs 12. As will be noted, in the particular discharge chute shown in FIG. 1 the upper ends 17 of the two chute walls that are parallel to the filter discs extend outwardly and upwardly at an angle $\phi$ towards the filter discs although, as will be discussed later, other chute configurations are in wide use.

As more fully described in U.S. Pat. No. 4,086,168, a replaceable plastic liner 21 may be fitted into chute 16 to prevent the cake 22 from adhering to the walls of the chute. An endless conveyor belt 23 is positioned proximate the discharge end of chute 16 to receive any cake 22 that passes through the chute.

In operation, as the filter discs are rotated through the tanks they pick up both liquid and solid material. As the discs continue to rotate, the liquid drains off leaving clumps of solid material, the so-called cake, adhering to the walls of the filter discs. As the cake dries, it falls off the walls of the filter discs and into the chute 16, thence onto the conveyor 23.

As shown in the drawing, there is a slight gap between the end of the chute extension 17 and the filter disc 12. Inevitably there will be some build-up of cake in that region and, as previously mentioned, under some circumstances the cake will also work its way between the liner 21 and the walls of the discharge chute.

FIG. 2 depicts an alternate embodiment for the cake chute 16 illustrated in FIG. 1. As shown, cake chute 16' differs from chute 16 in that the upper ends 17' of the two parallel side walls form short flanges at right angles to the main chute walls. FIG. 3 similarly shows another cake chute 16" wherein the upper ends 17", although angled upwardly at an approximately 45° angle, are significantly shorter than the flanges 17 shown in FIG. 1.

FIGS. 4–6 depict a first illustrative embodiment of the invention which is effective to inhibit the previously discussed problems of cake build-up and clogging. As shown, the invention comprises a molded, one-piece rectangular drop-on collar 31 that fits down over the upper end of any of the known discharge chutes to improve the discharge from the filter discs and to more efficiently direct the discharge of the cake down the chute. In FIG. 4, the collar 31 is shown fitted over a discharge chute of the type disclosed in FIG. 1; however, as will become apparent, the chute is not so limited and may also be used with chutes of the type disclosed in FIGS. 2 and 3, and others. As will be explained, collar 31 may also be used with or without the plastic chute liner 21. Collar 31 advantageously comprises a pair of first outer walls 32 which are oriented substantially parallel to the filter discs, and a pair of inner walls 33 that meet the outer walls 32 at a sharp angle. $\phi_2$, which is substantially larger than the angle $\phi_1$, made by the chute extensions 17.

Depending upon the nature of the material being separated, the impact of the cake falling on the inner walls 33 may be considerable. If this is the case, it is advantageous to provide collar 31 with a pair of reinforcement members 34 which are illustratively formed from foamed plastic, E.G. polyurethane As shown, each reinforcement member 34 is dimensioned to fit snugly in the upper extremity of the cavity formed between walls 32 and 33. In the particular arrangement shown in FIG. 4, the lower ends of the reinforcement members 34 are angled to mate with the extensions 17 of chute 16. Of course, if other shapes of discharge chutes are employed, a corresponding change will have to be made in the shape of members 34. Under some circumstances, two additional reinforcement members 34 may be needed to support the shorter pair of walls 33.

Collar 31 itself is advantageously molded from some suitable plastic and all corners thereof that may contact the cake are rounded. It will be noted that the lower extremities 38 of inner wall 33 are not vertical but, rather, make a small angle, typically 2°, to the vertical. This is done to make it easier to remove the liner from its mold during manufacture but has the side benefit that the collar is relatively easy to insert into any chute or chute liner.

In operation, and when used with a liner such as liner 21 the plastic liner 21 is fitted down into the chute 16, as before. Next, the collar 31 is pressed down over both the chute and the liner until the chute extensions 17 abut and mate with the reinforcing members 34. Because of the added thickness of collar 31, surface 37 is closer to the disc filter than chute extension 17 above would have been if no chute collar were used. Surface 37, in effect, almost acts as a doctor blade in removing cake from the surfaces of filter disc 12.

The far steeper angle that wall 33 makes with respect to the filter disc insures that the cake will not adhere to the walls of the chute but rather will fall directly onto the conveyor belt. It will also be noted that the invention makes it impossible for any cake to work its way between the liner and the chute. It is similarly impossible for the cake to work its way between the chute and the collar.

Figure 7:
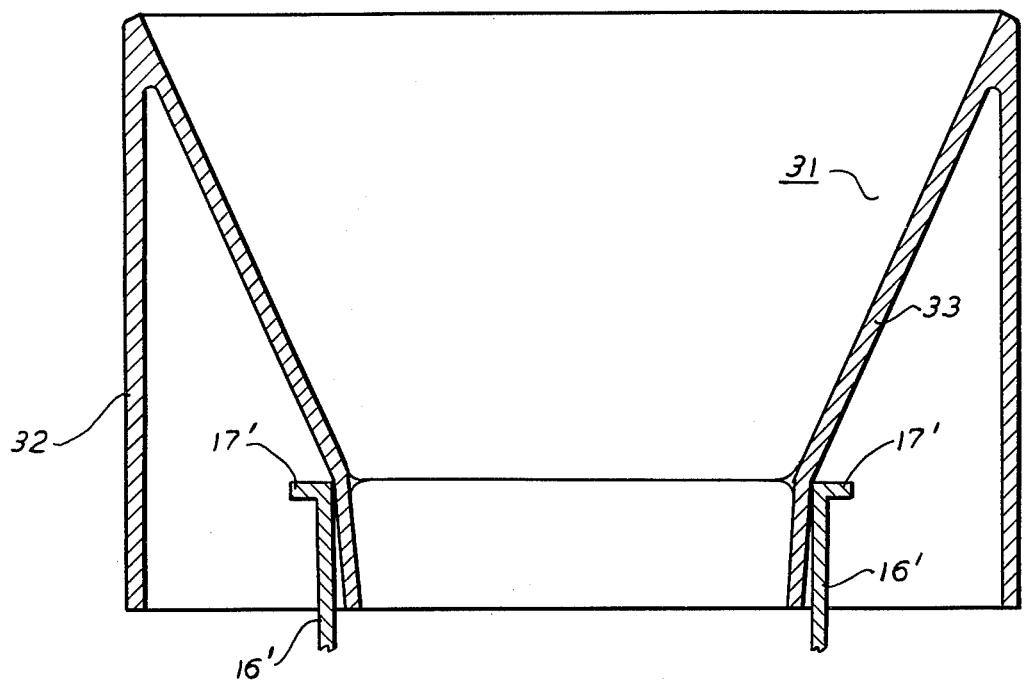
FIGS. 7 and 8 are cross-sectional views which respectively show the chute collar shown in FIGS. 4–6 in use with the alternate cake chutes shown in FIGS. 2 and 3.

FIG. 7 depicts chute collar 31 fitted over a discharge chute 16' of the type shown in FIG. 2. It will be noted that in this instance, no chute liner is employed and, because no heavy loads are expected, no reinforcing members 34 are needed.

Figure 8:
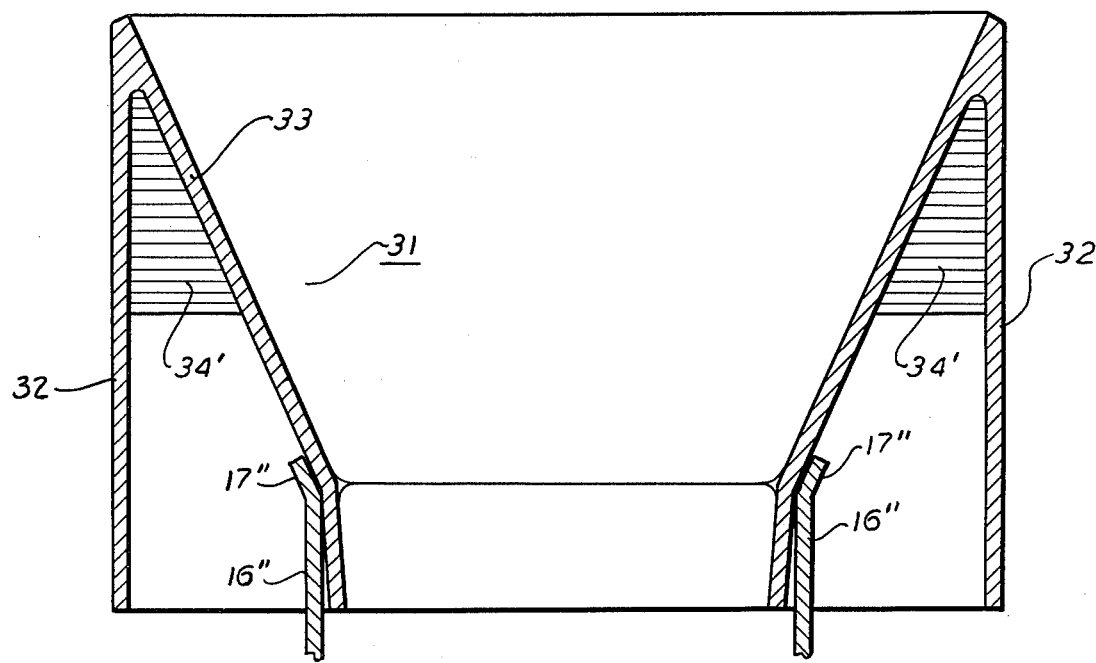

FIG. 8 depicts chute collar 31 fitted over a discharge chute 16" of the type shown in FIG. 3. Again, no chute liner is shown, but here, a pair of small, truncated reinforcing members 34' are shown, to resist moderate loads.

One skilled in the art will appreciate that it is possible to make various changes and substitutions to the layout of parts shown, without departing from the spirit and scope of the invention.

What is claimed is:

1. A collar for the cake discharge chute of a rotatable disc filter, said chute having a plurality of walls, the open upper ends of which define a cake inlet and the open lower ends of which define a cake outlet, said walls having internal surfaces interconnecting said cake inlet and outlet and defining a passage through said cake discharge chute through which said cake passes, said collar comprising:

a unitary member for pressing engagement about and with the open upper ends of the walls of said discharge chute, said member having:
   a plurality of outer walls parallel to the corresponding walls of said discharge chute;
   a plurality of inwardly and downwardly sloping inner walls each joined at its upper end to the upper end of a corresponding outer wall, said inner and outer walls defining a cake-receiving aperture substantially corresponding to and aligning with the cake inlet defined by the open upper ends of the walls of said chute, any cake material impinging upon said inner walls being forced downwardly under the influence of gravity along a path defined by the inward and downward geometry of said walls; and
   at least two reinforcing members positioned in respective hollow regions between opposing inner and outer walls of said collar for resisting the impact forces generated by said cake as it impinges upon said inner walls.

2. The collar according to claim 1 further comprising:
   four re-inforcing members, one of said members being positioned in each of the four hollow regions between the opposing inner and outer walls of said collar, for resisting the impact forces generated by said cake as it impinges upon said inner walls.

3. The collar according to claim 1 wherein the lower end of each reinforcing member is angled for substantial mating engagement with the outwardly extending portion of the corresponding chute wall.

4. The collar according to claim 1 wherein the upper end of each reinforcing member is angled for substantial mating engagement with the inner wall of said collar.

5. The collar according to claim 1 wherein said collar is comprised of plastic and said reinforcing member is comprised of foamed plastic.

6. The collar according to claim 1 wherein the lower extremities of said inner walls slope rapidly downward, making a small angle to the vertical plane, thereby to facilitate fitting said collar into said chute.

7. The collar according to claim 1 wherein a chute liner is fitted over said chute, said collar pressing said liner into engagement with said chute to retain same.

8. A collar for the cake discharge chute of a rotatable disc filter including at least a pair of vertical rotatable filter discs, said chute disposed between said pair of filter discs and having a plurality of walls, the open upper ends of which define a cake inlet and the open lower ends of which define a cake outlet, said walls having internal surfaces interconnecting said cake inlet and outlet and defining a passage through said cake discharge chute through which said cake passes, said walls proximate said filter discs having upwardly and outwardly extending portions which make a first angle $\phi$ with respect to a horizontal reference plane, said cake having a tendency to adhere to said internal surfaces of said walls of said cake discharge chute, said collar comprising:
- a unitary member for pressing engagement about and with the open upper ends of the walls of said discharge chute, said member having:
- a plurality of outer walls parallel to the corresponding walls of said discharge chute;
- a plurality of inwardly and downwardly sloping inner walls each joined at its upper end to the upper end of a corresponding outer wall, said inner and outer walls defining a cake-receiving aperture substantially corresponding to and aligning with the cake inlet defined by the open upper ends of the walls of said chute, said inner walls making a second angle $\phi_2$ with respect to said said horizontal reference plane, said second angle $\phi_2$ being greater than first angle $\phi$ to provide the inner walls with a steeper angle with respect to said horizontal reference plane than said upwardly and outwardly extending portions of said chute walls proximate said filter discs to enhance the passage of said cake through said cake discharge chute and to reduce said tendency of said cake to adhere to said internal surfaces of said walls of said cake discharge chute.

9. The collar according to claim 8 further comprising:
- at least two reinforcing members positioned in respective hollow regions between opposing inner and outer walls of said collar for resisting the impact forces generated by said cake as it impinges upon said inner walls.

* * * * *